US009746857B2

(12) United States Patent
Iversen (10) Patent No.: US 9,746,857 B2
(45) Date of Patent: Aug. 29, 2017

(54) MIXING VALVE

(71) Applicant: GRUNDFOS MANAGEMENT A/S, Bjerringbro (DK)

(72) Inventor: Kåre Iversen, Langå (DK)

(73) Assignee: GRUNDFOS MANAGEMENT A/S, Bjerringbro (DK)

( * ) Notice: Subject to any disclaimer, the term of this patent is extended or adjusted under 35 U.S.C. 154(b) by 0 days.

(21) Appl. No.: 14/976,108

(22) Filed: Dec. 21, 2015

(65) Prior Publication Data

US 2016/0179109 A1  Jun. 23, 2016

(30) Foreign Application Priority Data

Dec. 22, 2014  (EP) .................................... 14199740

(51) Int. Cl.
*G05D 11/13* (2006.01)
*F16K 37/00* (2006.01)
(Continued)

(52) U.S. Cl.
CPC .......... *G05D 11/13* (2013.01); *F16K 11/0873* (2013.01); *F16K 37/005* (2013.01); *F24D 19/1024* (2013.01); *F24D 2220/0242* (2013.01); *Y10T 137/2529* (2015.04); *Y10T 137/2564* (2015.04); *Y10T 137/2657* (2015.04)

(58) Field of Classification Search
CPC .... G05D 11/13; G05D 11/131; G05D 11/132; F24D 19/1021; F16K 11/0873; F16K 37/005; Y10T 137/2499; Y10T 137/2529; Y10T 137/2657; Y10T 137/2564; Y10T 137/86493–137/86895

USPC .......... 137/88, 101.19, 118.01, 118.04, 111, 137/625–625.5, 872–876
See application file for complete search history.

(56) References Cited

U.S. PATENT DOCUMENTS 3,221,541 A * 12/1965 Osborne ................ G01N 25/14
73/28.01
3,545,470 A * 12/1970 Paton ..................... B65G 53/56
137/101
(Continued)

FOREIGN PATENT DOCUMENTS

DE      200 01 539 U1   4/2000
DE   10 2010 037227 A1   3/2012
(Continued)

*Primary Examiner* — William McCalister
(74) *Attorney, Agent, or Firm* — McGlew and Tuttle, P.C.

(57) ABSTRACT

A heating installation or cooling installation mixing device has a valve housing (14) including a first flow path from a first connection (A-B) to a second connection (A), and a second flow path from the first connection (A-B) to a third connection (B). A movable valve element (24), arranged inside the valve housing (14) in the flow paths, is configured to vary a ratio of cross sections of the flow paths. A valve element drive (36) is arranged on the valve housing (14) and includes an internal control device (38) for movement control of the drive (36) and includes a first communication interface (44) for external control device (40) communication and a second communication interface (46). An internal sensor (48, 50) is arranged in or on the valve housing (14) and is connected to the first communication interface (44) for transmitting a sensor signal to the external control device (40).

19 Claims, 6 Drawing Sheets

(51) Int. Cl.
*F16K 11/087* (2006.01)
*F24D 19/10* (2006.01)

(56) References Cited

U.S. PATENT DOCUMENTS

| | | | | |
|---|---|---|---|---|
| 4,269,211 A * | 5/1981 | Howard | ............... | E21B 36/00 |
| | | | | 137/118.01 |
| 4,467,834 A * | 8/1984 | Rochat | ............... | B01F 3/028 |
| | | | | 128/203.28 |
| 4,674,678 A * | 6/1987 | Knebel | ............. | G05D 23/1393 |
| | | | | 137/605 |
| 4,711,392 A * | 12/1987 | Kidouchi | ............. | F16K 11/20 |
| | | | | 137/332 |
| 5,095,950 A * | 3/1992 | Hallberg | ............. | G05D 11/003 |
| | | | | 137/625.17 |
| 5,165,450 A * | 11/1992 | Marrelli | ............. | F16K 11/052 |
| | | | | 137/118.01 |
| 6,561,217 B1 * | 5/2003 | Pan | ............. | F16K 11/052 |
| | | | | 137/487.5 |
| 6,854,658 B1 * | 2/2005 | Houghton | ............. | F16K 11/0746 |
| | | | | 137/625.41 |
| 7,458,520 B2 * | 12/2008 | Belz | ............. | G05D 23/1393 |
| | | | | 236/12.12 |
| 7,475,827 B2 * | 1/2009 | Schmitt | ............. | B01F 5/0268 |
| | | | | 236/12.11 |
| 2008/0105317 A1 * | 5/2008 | Litecky | ............. | B01F 5/0077 |
| | | | | 137/896 |
| 2010/0170574 A1 * | 7/2010 | Fauque | ............. | G05D 11/035 |
| | | | | 137/101.19 |

FOREIGN PATENT DOCUMENTS

DE    10 2012 002941 A1    4/2014
DE    10 2012 024583 A1    6/2014

\* cited by examiner

MIXING VALVE

CROSS REFERENCE TO RELATED APPLICATIONS

This application claims the benefit of priority under 35 U.S.C. §119 of European Patent Application 14 199 740.3 filed Dec. 22, 2014, the entire contents of which are incorporated herein by reference.

FIELD OF THE INVENTION

The invention relates to a heating installation or cooling installation mixing device.

BACKGROUND OF THE INVENTION

Mixing devices are often applied in hydraulic heating installations and/or cooling installations, in order to be able to set a feed temperature independently of the exit temperature of a heat source or cold source. In floor heating installations for example, it is necessary to reduce the feed temperature which prevails at the exit side of a heating boiler. This in mixing devices is effected in a manner such that two differently temperature-controlled fluid flows are mixed with one another, in order to set a desired exit temperature. Thus, cooled fluid from the return can be admixed to the feed in a heating installation for example. Vice versa, the feed temperature can be increased in a cooling installation, by way of heated fluid from the return being admixed to the feed.

In automatically controlled heating installations or cooling installations, the mixing device as a rule is designed as a mixing valve which is moved by a servomotor. A mixing control device which can either be provided as a separate module or can be integrated into the control of a heating boiler is necessary for activating the servomotor. The individual installation components not only therefore need to be hydraulically but also electrically connected to one another, which entails a larger assembly effort for the heating fitter.

SUMMARY OF THE INVENTION

With regard to this problem, it is an object of the invention, to provide an improved heating installation or cooling installation mixing device which can be integrated into the most varied of heating installations and/or cooling installations in a simple manner.

The heating installation or cooling installation mixing device according to the invention is provided for the application in a hydraulic heating installation and/or cooling installation. A fluid heat-transfer medium, for example water, is circulated in the circuit in such a hydraulic heating installation and/or cooling installation, wherein it flows through one or more heat sources and/or cold sources and consumers to be cooled and heated respectively. Cooling assemblies can be applied for example as a cold source, and fossil-heated boilers or solar installations as a heat source. All other suitable heat or cold sources can however also be applied.

The mixing device according to the invention comprises a valve housing which has a first, a second and a third connection, via which the valve housing can be connected to the conduit system of the heating installation and/or cooling installation. A first flow path from the first connection to the second connection and a second flow path from the first connection to the third connection are defined in the inside of the valve housing. Thus, fluid flows which are fed at the second and at the third connection can be mixed with one another and the thus mixed flow can leave the valve housing via the first connection. The mixing device can also be applied in the reverse direction, in order to divide a fluid flow if the fluid flow is fed to the first connection and exits out of the second and the third connection. A movable valve element is arranged in the inside of the valve housing, which is situated in both flow paths and is suitable for opening or closing the flow paths. The valve element is thus designed and arranged such that it varies the ratio of the cross sections of both flow paths to one another due to its movement or displacement. The flow in the two flow paths can be reciprocally changed in this manner. The valve element is preferably movable in a manner such that with a movement which reduces the first flow path in cross section, it simultaneously increases the second flow path in cross section and vice versa. The valve element is particularly preferably also movable into a position, in which at least one of the flow paths is completely closed. One of the flow paths can be closed for example in an end position in each case. I.e. the first flow path is closed and the second flow path is completely opened in a first end position of the valve element, whereas the first flow path is completely opened and the second flow path is completely closed in a second end position. The mixing device according to the invention in this basic design corresponds essentially to known mixing devices for hydraulic heating installation and cooling installations.

According to the invention, the heating installation or cooling installation mixing device is configured such that all components which are essential for the operation of the mixing device, with the exception of a control device are integrated into a construction unit. Thus, a drive for moving the valve element is arranged on the valve housing. With regard to the drive it is preferably the case of an electric motor, via which the valve element can be moved into certain positions in a targeted manner. The drive preferably also comprises detection means or a position sensor, in order to detect the current (actual) position of the valve element. The position detection in the case of a stepper motor can be detected by the motor itself or the position can be specified such that the detection of the actual position can be done away with. The drive according to the invention moreover comprises an internal control device for the movement control of the drive. The internal control device serves for the position control or position closed-loop control of the valve element, so that the internal control device ensures that the valve element assumes a position which is specified by an external control device to the internal control device, and preferably retains this position. For this, the output signal of a position sensor detecting the position of the valve element can be led as an actual value to the internal control device, in order to form a control loop. The internal control device moreover comprises a first communication interface for communication with the external control device having a corresponding second communication interface. Thus, the desired position of the valve element can be specified by the external control device which is preferably part of the mixing device according to the invention, to the internal control device, which is to say transmitted via the communication interfaces, wherein the internal control device then activates or closed-loop controls the drive such that the valve element assumes this desired position.

Moreover, according to the invention, an internal sensor is arranged in or on the valve housing and is connected to the first communication interface for transmitting a sensor signal to the external control device. Thus, the internal sensor on or in the valve housing can detect a state variable and transmit the corresponding sensor signal via the first communication interface to the second communication interface and thus to the external control device. The sensor signal can then be processed in the external control device. The external control device for example can be designed such that on the basis of the sensor signal it outputs a control variable for positioning the valve element, wherein this control variable then in turn is transmitted from the second communication interface to the first communication interface and then to the internal control device and is used by this for the activation of the drive.

Thus the drive, an internal control device for the drive, and a communication interface for communication with an external sensor, as well as at least one internal sensor are arranged on or in the valve housing, with the thus described design. All essential components are therefore integrated directly into the mixing device or into a construction unit on the valve housing. A valve subassembly with all essential components is therefore created. The installation efforts is thus simplified since preferably only the communication connection to the external control device needs to be created, and an electrical connection of the internal control device carried out, after the installation of the valve housing into the hydraulic conduit system. Further wirings for sensors or control devices are then preferably no longer necessary.

The division of the control device into an internal control device arranged on the valve housing, as well as an external control device, said division being created according to the invention has the advantage that a control device which can yet assume further control and communication tasks in a system can be used as an external control device. In particular, a control unit which is used in any case for other purposes can also assume the control of the mixing device, so that components which are present here in any case can be used for further functions. Also, the connection to external systems, such as sensors or further controls can be adopted or shared. This simplifies the construction of the valve housing with the internal control device arranged on or in this housing, since the functional scope of the internal control device is quite reduced.

The at least one sensor is preferably arranged in the valve housing on or in one of the flow paths, in order to detect at least one state variable of the medium located in the flow path. This state variable can then be used for the control or regulation (closed-loop control) of the mixing device, as described above. At least one external sensor, i.e. one arranged outside the valve housing can preferably be additionally provided, and this sensor is connected to the external control device, preferably separate at least from the first communication interface. Such a sensor can then detect a state variable in the hydraulic system at a location which is distanced to the mixing valve, i.e. to the valve housing. The sensor signal of this sensor can likewise be utilized by the external control device, in order to control or regulate (closed-loop control) the mixing device. In particular, a control variable for the valve element can be alternatively or additionally produced by the external control device on the basis of the sensor signal of the external sensor, and outputted. The external sensor can be connected via its own communication interface to the external control device. It is likewise possible for the connection of the at least one external sensor to also be effected via the described second communication interface which communicates with the first communication interface.

The assembly is further simplified due to the fact that the at least one external sensor is connected to the external control device independently of the first communication interface, since the external sensor without further ado can be arranged in a manner distanced to the valve housing and to the drive with the first communication interface, since a connection of these elements is not necessary.

With regard to the at least one internal sensor and/or the at least one external sensor it is further preferably the case of a pressure sensor, temperature sensor and/or flow sensor. Particularly preferably, it can be the case of a combined pressure sensor and temperature sensor, further preferably of a combined differential pressure sensor and temperature sensor. Such a temperature sensor for example can be arranged at an exit side of the mixing device, i.e. for example in a region of the first connection if this forms the exit, in order to detect the exit temperature of the medium flowing through the valve housing. This exit temperature can thus be closed-loop controlled by the external control device by way of setting the positioning of the valve element and thus of the mixing ratio between the fluid flows fed via the second and third connection. The flow is preferably determined via a pressure sensor or flow sensor, in order as the case may be, to ensure that the opening degree of the valve is sufficient. Moreover, for example the flow in one of the flow paths together with a temperature can form the basis of the setting of the mixing ratio, in order to achieve a desired exit temperature at a desired exit flow.

According to a further preferred embodiment of the invention, the drive is arranged in a motor housing which is connected to the valve housing or is formed as one piece with the valve housing, wherein preferably the internal control device is arranged in the motor housing or in an electronics housing connected to the motor housing. Thus, the electronics housing, the motor housing and the valve housing are directly arranged on one another or fastened on one another or integrated into one another, and thus form a construction unit which is delivered in a preassembled manner and can be installed as a whole into a hydraulic heating and/or cooling system by the heating fitter. The assembly effort for the electrical connection of the drive and internal control electronics is done away with when installing into a heating installation or cooling installation due to the fact that the internal control device is arranged directly on the motor housing. Moreover, the assembly of the drive with the valve element arranged in the valve housing, as is often necessary with known mixing devices, is done away with due to the integration or connection of the valve housing and motor housing.

The at least one internal sensor can be connected to the first communication interface via a conduit connection which is applied internally in the valve housing, motor housing and/or electronics housing. However, according to a preferred embodiment, the internal sensor is connected to the first communication interface via a cable running outside the valve housing. This has the advantage that no electrical connections need to be arranged in the inside of the valve housing, so that the insulation effort is reduced which is to say that the danger of contact of electrical components with the fluid led in the valve housing is avoided. However, despite the cable connection, the sensor with the valve housing and the remaining components can form a construction unit. This cable connection can also be delivered included, in a preassembled manner, since the motor housing or electronics housing is part of this construction unit as described above, so that this connection does not need to be created by the fitter only when on location when installing into the heating or cooling system.

The first and the second communication interface are particularly preferably designed as wireless communication interfaces, in particular as radio interfaces. This further simplifies the assembly, since no cable connection needs to be created between the external control device and the internal control device. The wireless connection or radio connection particularly preferably can be created automatically by way of suitable protocols. Actuation elements can also be provided on the first and/or second communication interface or on the internal or external control device, for creating the communication connection, wherein the communication connection is configured or created by these actuation elements. Keys can be provided for example, which need to be pressed in order to create the communication connection, i.e. to permit a mutual locating of the first and second communication location. The communication interfaces can moreover be designed such that they permit a coding or identification, and create a fixed connection between exactly one first and second communication interface. It is thus possible to operate several mixing device in direct vicinity, without these mutually interfering with one another. It is also possible for one external control device to communicate with several internal control devices of several mixing valves, in order to control or regulate these.

The heating installation or cooling installation mixing device according to the invention particularly preferably further comprises at least one circulation pump assembly which serves for delivering a heat-transfer medium, i.e. fluid, through the flow paths in the valve housing. Thereby, the circulation pump assembly particularly preferably is connected or connectable to one of the connections of the valve housing, for example to the first connection serving as an exit. With this connection, the circulation pump assembly is arranged such that it delivers the fluid away from the first connection. If the valve is applied the other way round such that the flow which is fed to the first connection is divided towards the second and third connection, the circulation pump assembly can also be arranged the other way round, so that it delivers fluid towards the first connection. A distanced arrangement of the circulation pump assembly is also possible. Preferably corresponding flanges which can be connected to one another for example by way of a clamping or screw connection are formed on the circulation pump assembly and the connection of the valve housing which is provided for connection to the circulation pump assembly, for the mechanical connection between the circulation pump assembly and the valve housing. Hereby, it is particularly the case of a releasable connection which permits the circulation pump assembly to be separated from the valve housing. This on the one hand permits a manufacture of the valve housing independently of the pump housing and on the other hand permits a disassembly for maintenance and repair purposes. Moreover, a distanced installation into a hydraulic system is thus rendered possible. The independent manufacture of the pump housing moreover has economic advantages, since it is not necessary to provide a specially manufactured pump housing for the mixing device, but instead a circulation pump assembly which can also be applied for other purposes can be applied here as a part of the mixing device according to the invention.

Particularly preferably, the external control device is part of the circulation pump assembly and further preferably serves simultaneously for the control or regulation of the circulation pump assembly. Thus the external control device preferably can directly control two variables which are essential for the temperature regulation, specifically the flow by way of the activation of the circulation pump assembly and the mixing ratio between the two flow paths in the valve housing by way of activation of the drive of the valve element. Thus an autonomous mixing device is created, whose control is preferably completely assumed by control electronics which are integrated into the circulation pump assembly. Electronic components can moreover be spared in this manner, since microprocessors for example, which are necessary in any case for the control of the circulation pump assembly, in particular for the speed control of the circulation pump assembly, can be also used for the control of the valve device. The external control device is preferably integrated into an electronics housing or a terminal box of the circulation pump assembly. The second communication interface which is part of the external control device thereby is preferably also co-integrated into the circulation pump assembly, in particular into its electronics housing. Thus as a whole a simple assembly is achieved, since one merely needs to create an electrical connection of the circulation pump assembly and of the drive on the valve housing, and to create the communication connection between the first and the second communication interface. Since the latter is particularly preferably designed in a wireless manner, thereby preferably no electrical connection whatsoever is necessary directly between the circulation pump assembly and the drive or the internal control device.

Further preferably, the external control is configured for the control and/or regulation of the position of the valve element and/or of the speed of the circulation pump assembly, on the basis of at least one output signal of the at least one internal sensor and/or at least one external sensor, and outputs a setpoint for the position of the valve element, to the internal control device. As described, the internal control device then ensures that the valve element is set to this setpoint via the drive. Thus the complete control of the mixing device is assumed by the external control device which for this communicates with the necessary sensors. This has the advantage that the necessary electronics for the internal control device which must be arranged on or in the motor housing of the drive can be kept simple, so that an inexpensive construction is possible here.

According to a further preferred embodiment of the invention, the at least one internal sensor detects a pressure difference between one of the connections and a receiving space, in which the valve element is arranged, or between two of the connections. Thus the pressure difference at the entry side or exit side of the cross-sectional reduction formed by the valve element in the respective flow path is detected. It is possible to determine the flow through these flow paths in the valve housing on the basis of this pressure difference.

Particularly preferably, the external control device is configured in a manner such that it computes a flow through the mixing device on the basis of at least one pressure difference detected by at least one internal sensor. The internal sensor for this is configured as a differential pressure sensor and is arranged in the valve housing such that it is in connection with the necessary locations of the flow path, between which locations the pressure difference is to be determined. The evaluation of the flow is effected in the external control device, preferably on the basis of the detected pressure difference and the position of the valve element which is specified by the control device and by way of which the opening degree of the respective flow path is known to the control device. I.e. the flow can be determined with the knowledge of the known cross section of the flow path and the pressure difference.

According to a further preferred embodiment, the valve housing comprises an outwardly opened sensor receiver, into which the at least one sensor is inserted from the outside in a removable manner. This has the advantage that the sensor can be easily removed for maintenance and repair purposes and exchanged as the case may be. The sensor is preferably provided with a seal, so that the sensor when it is inserted into the sensor receiver, seals this receiver to the outside, so that no fluid can exit through the sensor receiver to the outside, out of the interior of the sensor housing.

Preferably, at least one detection section or detection region of the at least one internal sensor is arranged in a sensor space of the sensor receiver in the inside of the valve housing, wherein this sensor space is connected via at least one connection channel to at least one of the flow paths, and the sensor space is situated outside the flow paths. The sensor thus with its detection regions is arranged outside the flow paths, so that the cross section in the flow paths is not compromised by the sensor.

Further preferably, the sensor space is connected with a first connection channel to one of the flow paths, upstream of the valve element, and with a second connection channel to a receiving space, in which the valve element is arranged. Thereby, the second connection channel is preferably connected to the receiving space at a location which is situated downstream of the cross-sectional reduction formed by the valve element. The pressure difference can be detected by the sensor at the entry side and exit side of the valve formed by the valve element.

According to a further preferred embodiment of the invention, the first, second and the third connection, a receiving space in which the valve is arranged, as well as at least one sensor receiver for the at least one internal sensor are arranged in a common section of the valve housing which is configured as one piece. Particularly preferably, all these mentioned components are arranged in a valve housing which is configured in a single-part or one-piece manner, wherein the valve housing can possibly yet comprise cover elements or closure elements, in order to close openings which are present, for example an opening through which the valve element is inserted into the valve housing and through which a drive shaft for moving the valve element into the receiving space extends. The number of parts is reduced due to the single-part or single piece design, and the construction of the mixing device is simplified.

As specified above, the mixing device according to the invention can be used for mixing two fluid flows as well as for dividing a fluid flow into fluid flows. Thereby, with the division, the ratio of the produced part-flows to one another can be set. Accordingly, the flow direction through the flow paths in the mixing device according to the invention, can be effected either departing from the second connection and the third connection to the first connection, in order to provide a mixing function, but also the other way round, can run from the first connection to the second connection and the third connection, in order to provide a dividing function.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the mixing device which is shown in this example is described by way of the use in a heating installation. However, it is to be understood that the mixing device can also be used in a cooling device in the same manner. Cooler fluid from the return is admixed to a warm feed flow with the help of the mixing device, in a hydraulic heating installation, in order to reduce the temperature. Vice versa, warmer fluid from a return flow is admixed to a cold feed flow in a hydraulic cooling device, in order to increase the feed temperature. The mixing device can also be applied for applications other than the temperature regulation in a hydraulic heating installation or cooling installation. Inasmuch as this is concerned, the subsequent description is only to be understood as an example and does not limit the application of the mixing device described hereinafter to the purpose described here.

Figure 1:
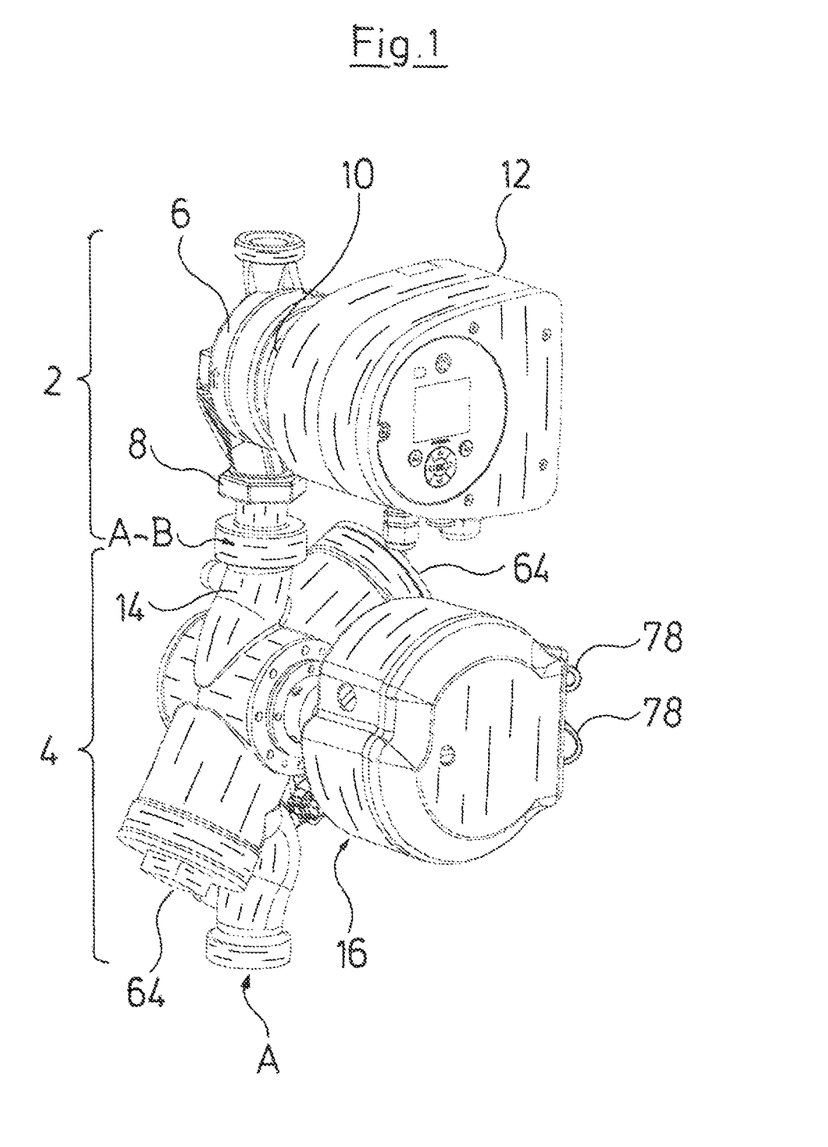
FIG. 1 is a perspective view of the arrangement of a heating installation or cooling installation mixing device according to the invention, with a circulation pump assembly.
Figure 2:
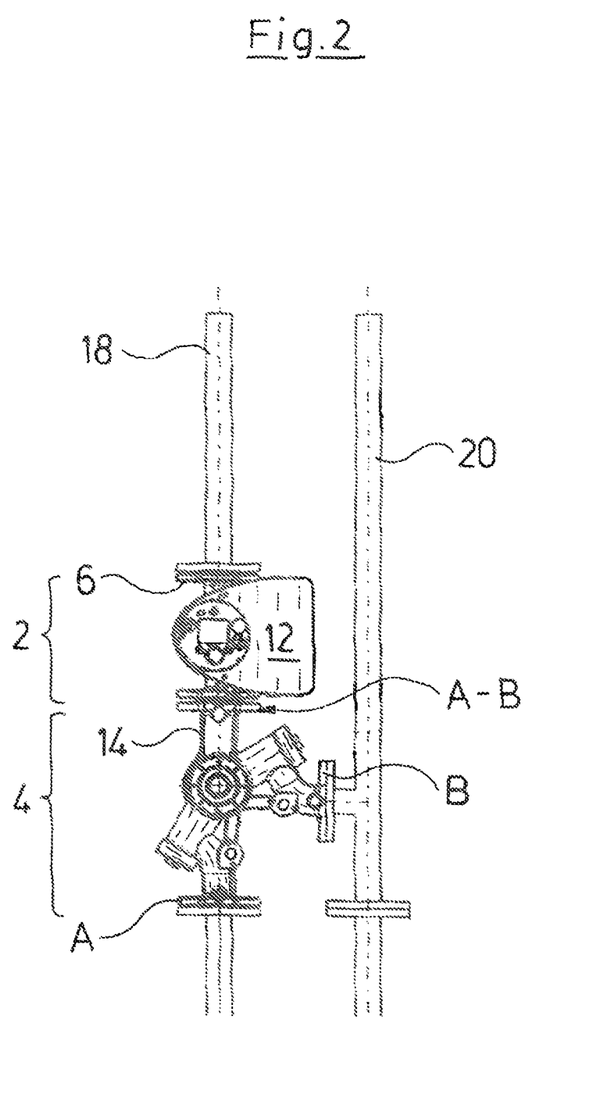
FIG. 2 is a perspective view of the arrangement of the mixing device according to FIG. 1, in a forward and return conduit of a heating system or cooling system.

The mixing device shown in FIGS. 1 to 4 comprises two essential components, specifically on the one hand a circulation pump assembly 2 and on the other hand a valve subassembly 4, and these form separate subassemblies, and in the example shown in FIGS. 1 and 2 are releasably connected to one another in a direct manner via a flange connection or a thread connection.

The circulation pump assembly 2 is designed in the known manner and comprises a pump housing 6, in which an impeller which is not shown here rotates. The pump housing 6 here is connected with its entry or entry flange 8 to the valve subassembly 4. A stator housing or motor housing 10, in which an electrical drive motor for the drive of the impeller is arranged, is fastened on the pump housing 6. A terminal box or electronics housing 12, in which the electrical connections and control and regulation electronics for the control and regulation of the drive motor in the motor housing are located, is attached on the motor housing 10. The electronics in particular can compromise a speed controller with a frequency converter.

The valve subassembly 4 comprises a valve housing 14. A motor housing 16, in which an electrical drive motor or servomotor (hereinafter drive 36) is arranged for moving a valve element in the valve housing, is arranged on this valve housing. The motor housing 16 simultaneously serves as an electronics housing and accommodates an internal control device which is described hereinafter. The valve housing 14 comprises three connections A, B and A-B, wherein the connection B is covered by the motor housing in the representation in FIG. 1. In the example shown here, the connections A, B and A-B comprise connection flanges for the connection to pipe conduits, wherein the connection A-B is directly releasably connected to the entry 8 of the pump housing 6 via a flange connection.

The connections A, B and A-B in the inside of the valve housing 14 are connected to one another such that the flow paths run from the two connections A and B to the connection A-B. A first flow path runs from the connection A to the connection A-B, a second flow path runs from the connection B to the connection A-B. Thus two flows which are fed through the connections A and B can be mixed, and these commonly exit from the connection A-B. Alternatively, in the reverse direction, given the feed of a flow into the connection A-B, this flow can be divided up into two part-flows by the connections A and B.

FIG. 2 shows a first exemplary arrangement of the mixing device in a heating system, wherein the motor housing 16 of the valve subassembly 4 has been omitted in this representation. In the example shown in FIG. 2, the mixing device consisting of the circulation pump assembly 2 and the valve subassembly 4 are arranged in a feed conduit 18, so that the fluid flow in the feed conduit 18 runs from the connection A through the valve housing 14 to the connection A-B and subsequently through the pump housing 6. The connection B of the valve housing 14 is connected to a return conduit 20, for example of a heating circuit. I.e. a heated heat-transfer medium, in particular water, is fed to a consumer, through the feed conduit 18. The cooled-down heat transfer medium flows back through the return conduit 20. A part of the heat transfer medium flow from the return conduit 20 can be admixed via the connection B through the valve housing 14 to the flow in the feed conduit 18, in order to reduce the feed temperature. This arrangement is shown schematically also in FIG. 3, by way of which the internal construction and the manner of functioning of the mixing device is described in more detail.

A receiving space is formed in the inside of the valve housing 14, in which receiving space a movable valve element 24, here in the form of a valve ball, is arranged. The valve element 24 comprises a recess 26 which can release a flow path through the valve with a different cross section. The connections A, B and A-B are in connection with the receiving space 22. Thereby, a valve seat 28 is situated in the flow path from the connection A to the receiving space 26 and a valve seat 30 in the flow path form the connection B to the receiving space 26, on which valve seats the valve element 24 comes to sealingly bear. The closed part 32 can completely or only partly close one of the valve seats 28 or 30, depending on how the valve element 24 is rotated via the motor. Both flow paths are opened in the position shown in FIG. 6, so that a flow passage is given from the connection A as well as from the connection B, into the inside of the receiving space 22 and from this to the connection A-B. The closed part 32 of the valve element 24 can completely or partly close one of the valve seats 28, 30, depending on the rotation of the valve element 24. Thus the mixing ratio of the two flows fed through the connections A and B to one another can thus be regulated. Conversely, the ratio of the division of a flow fed through the connection A-B to the connections A and B can be regulated.

Figure 3:
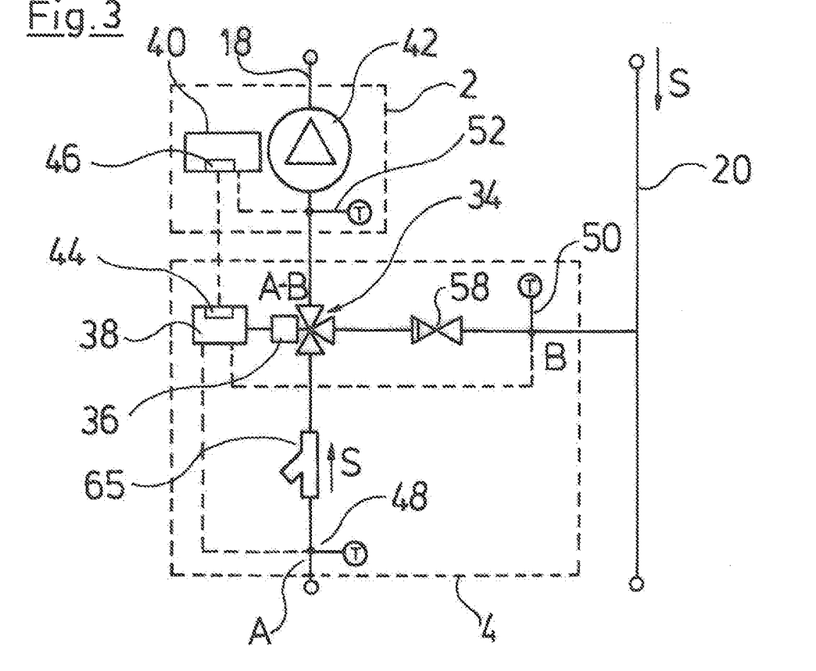
FIG. 3 is a schematic view of the arrangement of the heating installation or cooling installation mixing device according to the invention, for mixing two fluid flows.

The use of the mixing device for mixing two fluids as has been described by way of FIG. 2 is shown in FIG. 3. The circulation pump assembly 2 with its integrated components and the valve subassembly 4 are represented by the dashed lines, i.e. all components within these dashed lines are part of the circulation pump assembly 2 or of the valve subassembly 4. A significant constituent of the valve subassembly 4 is the actual valve 34 which is formed by the valve seats 28, 30, the receiving space 22 and the valve element 24, which are not shown in detail in the FIGS. 3 and 4. A drive 36, for example in the form of a drive motor, in particular a stepper motor is arranged on the valve 34. This drive 36 is activated by an internal control device 38. The control electronics arranged in the electronics housing 12 of the pump assembly 2 simultaneously forms an external control device 40. The electronics of the external control device 40 serves on the one hand for the control of the pump assembly 2 and in particular of the drive motor 42 which is arranged in the motor housing (see FIG. 1), and on the other hand also for the control or regulation of the valve 34 of the valve subassembly 4.

The internal control device 38 which directly activates the drive 36 and preferably forms a part of the drive 36 comprises a first communication interface 44. The external control device 40 which is part of the pump assembly 2, comprises a second communication interface 46 which is configured in a manner corresponding to the first communication interface 44 so that data can be transmitted and exchanged between the communication interfaces 44 and 46. The communication interfaces 44 and 46 are preferably designed as radio interfaces, so that a wireless communication is possible between the circulation pump assembly 2 and the valve subassembly 4 or its internal control device 38.

The external control device 40 serves for the actual control of the valve subassembly 4 and in particular of the valve 34 which means that the external control device 40 sets the position or the position to be assumed, of the valve element 24. The external control device 40 thus sets the mixing ratio between the two flow paths through the connections A and B which is to be set, which is to say in which ratio the openings of the valve seats 28 and 30 are to be brought by way of positioning the valve element 34. This position setpoint for the valve element 34 is transmitted via the second communication interface 46 to the first communication interface 44 and, with this, to the internal control device 38. This then in turn closed-loop controls the drive 36, so that the valve element 24 assumes its desired position. The drive 36 as specified, can be designed as a stepper motor or however, as the case may be, can contain a position sensor which detects the actual positioning of the valve element 24 and notifies this to the internal control device 38 which then closed-loop controls the drive 36 such that the valve element 24 is brought into the desired position which is specified by the external control device 40.

The internal control device 38 however not only serves for the control or regulation of the drive 36, but also for the transmission of sensor signals of two internal sensors 48 and 50. The sensors 48 and 50 here are designed as temperature sensors which on the one hand detect the temperature in the entry 8 which is to say between the connection A and the receiving space 22, wherein the second temperature sensor 50 detects the temperature of the fluid in the flow path between the connection B and the valve 34 or the receiving space 22. The detected temperature values are transferred to the internal control device 38 which then transmits them via the first communication interface 44 to the second communication interface 46. Thus the detected temperature values are led from the external control device 40 into the pump assembly 2. A processing of the signals of the internal sensors 48 and 50 in the internal control device 38 is not effected. As explained further below by way of FIG. 6, with regard to the sensors 48 and 50, it is the case of combined temperature-pressure sensors which moreover yet detect a differential pressure between the connections and the receiving space 22. With the knowledge of the opening degree of the valve 34, the flows through the connections A and B can be determined on the basis of this differential pressure which is likewise transmitted on the mentioned path via the internal control device 38 and the communication interfaces 44 and 46 to the external control device 40. A further sensor 52 in the form of a temperature sensor is integrated into the circulation pump assembly 2, in particular into the pump housing 6, and detects the entry temperature in the entry of the circulation pump assembly 2. This temperature signal is likewise transmitted to the external control device 40. The external control device 40 for setting a desired temperature at the point of the sensor 52 can closed-loop control the valve 34 of the valve subassembly 4 on the basis of the signals from the sensors 48, 50, 52, such that a necessary mixing ratio of the flows through the connections A and B is set by positioning the valve element 24.

As is to be recognized, all essential components for the mixing device with the exception of the external control device are integrated into the valve subassembly 4. The valve 34 with the adjustable valve element 24, its drive 36 as well as the necessary internal sensors 48 and 50 are therefore integrated into a subassembly. An internal control device 48 which assumes the position regulation of the valve element 24 via the drive 36 and serves for data transmission to the external control device 40 via an integrated communication interface 44 is likewise integrated. A control device for the control of the mixing system is not present here. The function of the control device is assumed by the external control device 40 which here is part of the pump assembly 2, and thus the microprocessor for the control of the pump assembly and which is necessary in the pump assembly 2 in any case can be used for this additional control task. However, an external control device which is independent of the pump assembly could also be provided. No direct electrical connection between the circulation pump assembly 2 and the valve subassembly 4 is necessary, since a wireless communication is preferably provided between the communication interfaces 44 and 46. Rather, the valve subassembly 4 and the circulation pump assembly 2 merely need to be supplied with energy, preferably via a mains connection. The communication interfaces 44 and 46 are preferably designed in a manner such that they automatically build up a communication with one another. A very low transmitting power is sufficient for the radio transmission since the circulation pump assembly 2 and the valve subassembly 4 are preferably arranged directly on one another.

Figure 4:
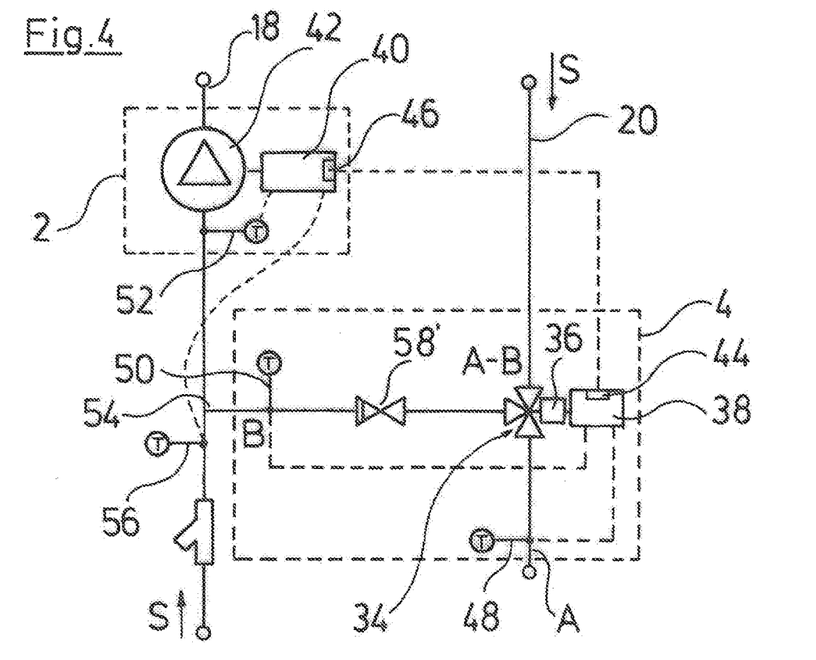
FIG. 4 is a schematic view of the arrangement of a heating installation or cooling installation mixing device according to the invention, for dividing up a fluid flow.

The embodiment example according to FIG. 4 differs from the embodiment example according to FIG. 3 only by the installation location of the valve 34. Here, the valve 34 is not used for mixing two flows but for dividing up a flow. The result however is again that a part of the return is admixed to the feed, as is explained hereinafter. The same valve subassembly 4 and the same circulation pump assembly 2 are used with the embodiment example according to FIG. 4. The circulation pump assembly 2 as also in the embodiment example according to FIG. 3 is arranged in a feed conduit or in a feed 18, so that it delivers a heat-transfer medium, such as water for example, through the feed 18. In this embodiment example, the valve subassembly 4 however is not directly connected to the circulation pump assembly 2, but is arranged in the return conduit 20, and specifically such that the connection A-B of the valve subassembly 4 functions as an entry and the connection A as an exit of the return conduit 20. The connection B is connected to the feed conduit 18 at a node point 54, upstream of the circulation pump assembly 2. Here too, a mixing device is created, which can admix heat-transfer medium from the return conduit 20 to the feed 18 at the node point 54. The quantity of admixed heat-transfer medium from the return conduit 20 depends on the position of the valve element 34 which changes the ratio of the openings or the opening degrees of the flow paths to the connections A and B in relation to one another. Thus in the extreme case the flow path to the connection A can be closed, so that the complete return is led through the connection B again into the feed conduit 18. In the other extreme case, the connection B can be closed so that no admixing into the feed conduit 18 is effected and the complete flow is led in the return conduit 20 to the connection A Here too, the control of the valve 34 or the setting of the opening degree or the positioning of the valve element 24 is specified by the external control device 40 in the circulation pump assembly 2 and is transmitted via the communication interfaces 46 and 44 to the valve subassembly 4. In the reverse direction, the readings are transmitted from the internal sensors 48 and 50 to the external control device 40, as has been described beforehand.

In this embodiment example, an external temperature sensor 56 is yet arranged in the feed conduit 18, upstream of the node point 54, additionally to the temperature sensor 52 in the circulation pump assembly 2, in order to detect the temperature of the heat transfer medium upstream of the node point 54. The temperature sensor 56 is likewise connected to the external control device 40, for example via a cable or also via a wireless communication connection. Thus the external control device 40 can detect the temperature of the heat-transfer medium upstream and downstream of the node point 54. Moreover, the temperatures in the return 20 are detected via the sensor 48 and/or the sensor 50. The desired mixing ratio, in which the heat transfer medium must be admixed from the return 20 to the feed 18 can be determined by the external control device 40 on the basis of these variables. Moreover, the flows can be determined via differential pressure sensors 48 and 50 as described previously.

A check valve 58 and 58' is arranged in each case in the flow path from the connection B to the valve 34 or the receiving space 22, in the embodiments according to FIGS. 3 and 4. The check valve 58 is arranged such that a flow is only possible from the connection B to the valve 34 or its receiving space 22. The check valve 58' is arranged the other way round, so that a flow is only possible from the valve 34 or its receiving space 22 to the connection B. The check valves 58, 58' can have an identical construction and merely be applied into the valve housing 14 the other way round.

Figure 5:
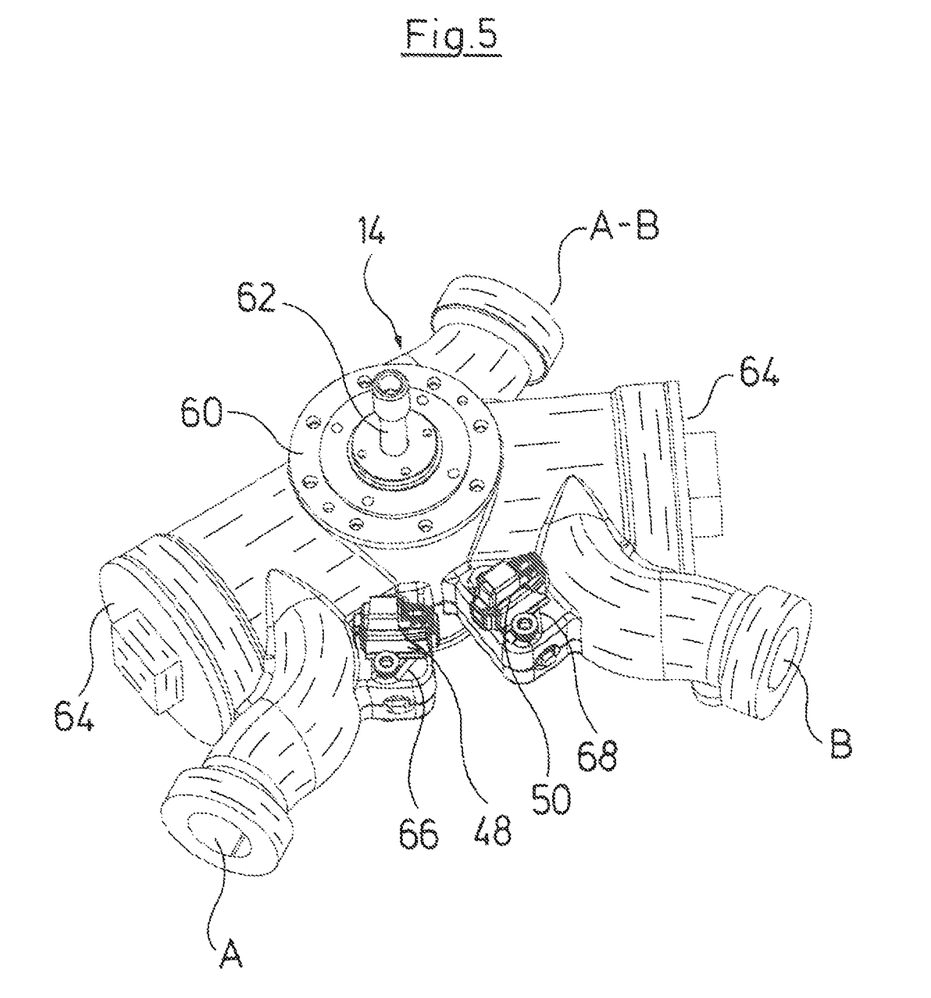
FIG. 5 is a perspective view of a valve housing of a heating installation or cooling installation mixing device according to the invention.
Figure 6:
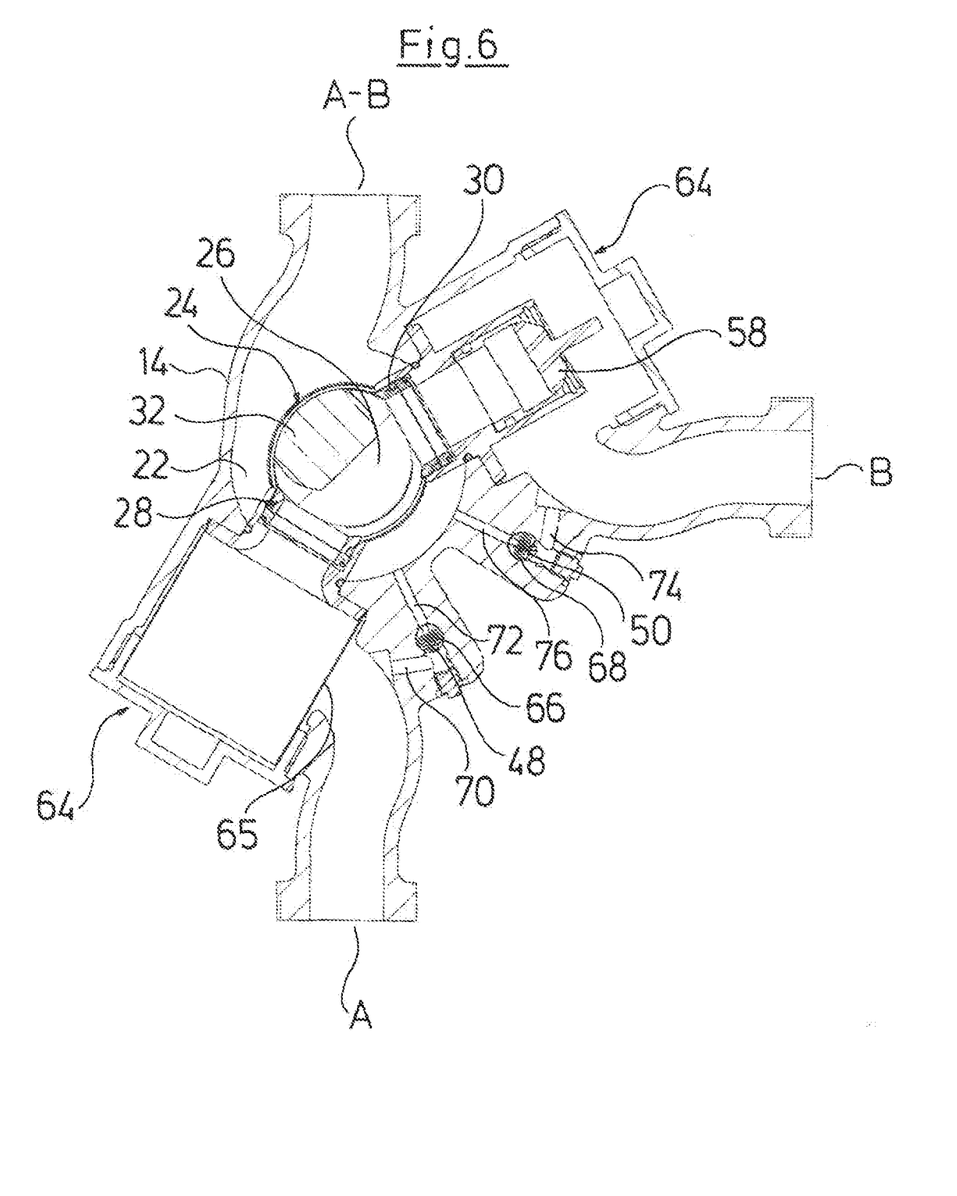
FIG. 6 is a sectioned view of the valve housing according to FIG. 5, with the use of the mixing device for mixing two fluid flows.
Figure 7:
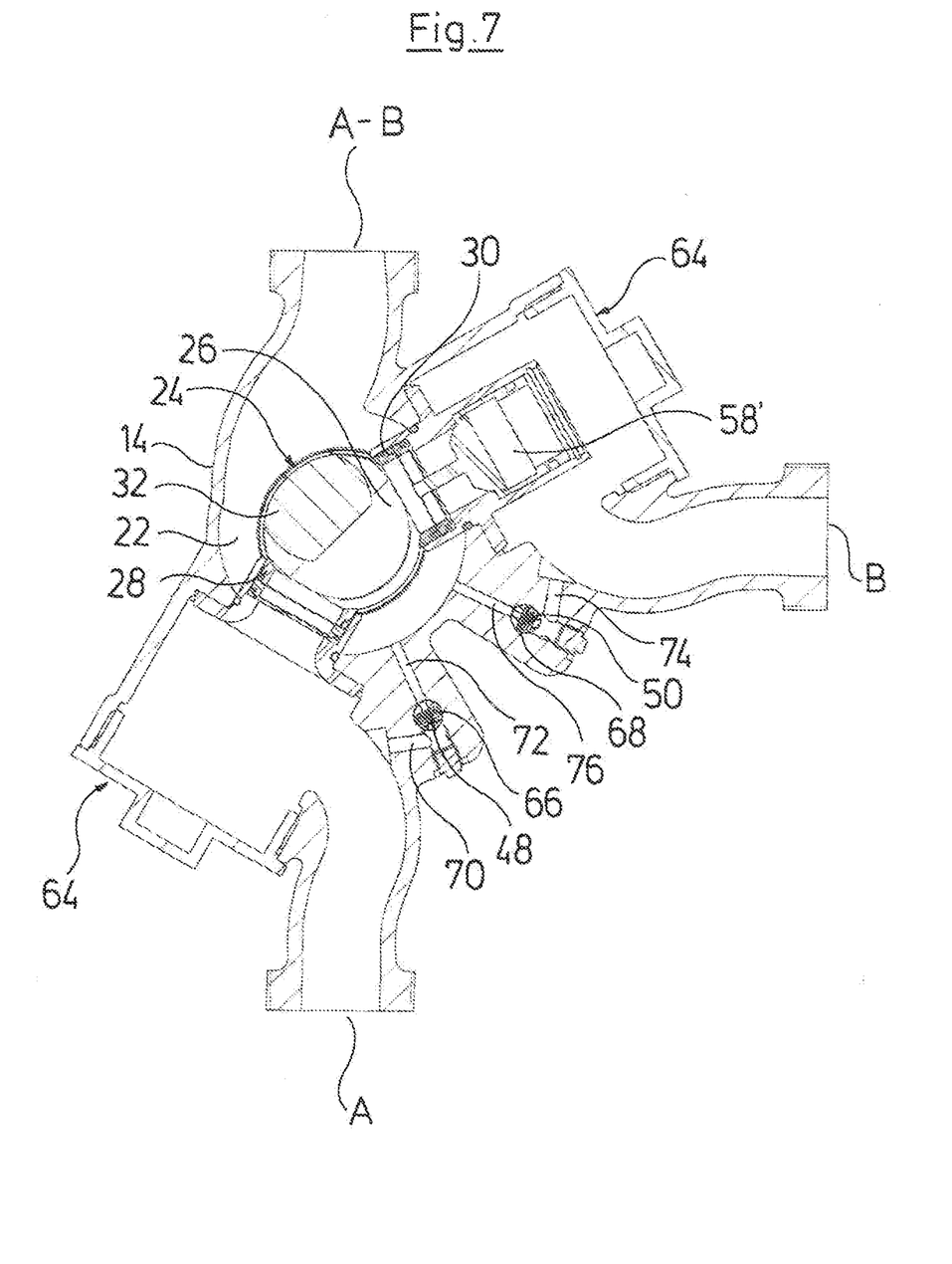
FIG. 7 is a sectioned view of the valve housing according to FIG. 5, with the use of the mixing device for dividing a fluid flow into two part flows.

The construction of the valve housing is now explained in more detail by way of the FIGS. 5 to 7. The valve housing is preferably designed as one piece of metal, in particular as a cast component and apart from the connections A, B and A-B comprises an opening 60, through which the valve element 24 is applied into the receiving space 22. The opening 60 is closed in FIG. 5 by a cover 60, through which a shaft 62 extends outwards. The shaft 62 in the inside of the valve housing 14 is connected to the valve element 24 in a rotationally fixed manner and is connected at the outside to the drive 36 in a rotationally fixed manner. Moreover, the valve housing 14 comprises two assembly openings 64 which in operation are likewise sealingly closed by a cover, as is represented in FIGS. 5 and 6. The assembly openings 64 are each assigned to one of the connections A and B and serve for being able to insert the valve seats 28 and 30 as well as the check valve 58, 58' into the valve housing 14. The check valve 58 or as the case may be 58' is thus likewise directly integrated into the valve housing 14. Alternatively or additionally to the check valves 58, 58', filter elements or sieve elements can also be inserted through the assembly openings 64, and these are then situated in the flow path from the connections A, B to the receiving space 22.

An arrangement is shown in FIG. 6, which corresponds to the application according to FIG. 3. In FIG. 6, the mixing valve is configured for mixing two flows. For this, a check valve 58 which opens in the flow direction from the connection B to the connection A-B is arranged in the flow path from the connection B to the receiving space 22. FIG. 7 in contrast to this shows the configuration of the mixing device for use in the case of application which is shown in FIG. 4 and in which the mixing device is used for dividing a flow, i.e. the flow direction is directed from the connection A-B to the connections A and B. In this case, the check valve 58' which opens in the flow direction from the connection A-B to the connection B is arranged in the flow path from the receiving space 22 to the connection B. In the examples shown in FIGS. 6 and 7, in each case only one check valve 58 and 58' respectively is shown in the flow path which connects to the connection B. However, it is to be understood that a correspondingly designed check valve 58 or 58' could alternatively or additionally also be arranged in the flow path connecting to the connection A. The mixing devices shown in the FIGS. 6 and 7 are otherwise designed in the same manner.

Moreover, a sieve insert 65 which serves for holding back contaminations contained in the flow fed via the connection A, is arranged in the flow path from the connection A to the receiving space 22, in FIG. 6, so that this contamination cannot compromise the actual valve consisting of the valve element 24 and the valve seat 28, with regard to its functioning. The filter or the sieve insert is likewise shown in FIG. 3 in the feed conduit to the valve 34. It is to be understood that a corresponding sieve insert 65 could also be arranged in a corresponding manner in the flow path departing from the connection B. Moreover, also with the arrangement according to FIG. 7, such a sieve insert could also be inserted into one or both assembly openings 64. The sieve insert 65 is designed as a tubular sieve. It can be removed from the assembly opening 64 for cleaning purposes.

Moreover, two sensor receivers 66 and 68 are formed on the valve housing 14, wherein the sensor receiver 48 is inserted into the sensor receiver 66, and the sensor 50 is inserted into the sensor receiver 68. The sensor receivers 66 and 68 comprise openings which are open to the outside, through which the sensors 48 and 50 are inserted, wherein the sensors 48 and 50 sealingly close the openings to the outside. A sensor space of the sensor receiver 66 is connected via a first connection channel 70 to the flow path from the connection A to the receiving space 22, upstream of the valve seat 48 and via a second connection channel 72 directly to the receiving space 22. Thus the sensor 48 which is arranged in the sensor receiver 66 on the one hand can determine the temperature in the flow path which connects to the connection A, and on the other hand can determine the differential pressure between this flow path and the receiving space 22. Accordingly, a sensor space of the sensor receiver 68 is connected via a first connection channel 74 to the flow path from the connection B to the receiving space 22, upstream of the valve seat 30 and via a second connection channel 76 directly to the receiving space 22. Thus the sensor 50 inserted into the sensor receiver 68 on the one hand can determine the temperature in the flow path departing from the connection B and on the other hand the pressure difference between this flow path and the receiving space 22. Thereby, essentially the pressure at the exit side of the valve, which means downstream of the two valve seats 28 and 30 prevails in the receiving space 22 when the valve is inserted in the manner shown in FIG. 3. Alternatively, the two connection channels 72 and 76 could also be connected to the flow path between the receiving space 22 and the connection A-B.

What is essential with the embodiment example according to FIGS. 5 and 6 is that the sensor receivers 66 and 68 or their sensor spaces, in which the actual sensor regions or detection regions of the sensors 48 and 50 come to lie, are integrated with the associated connection channels likewise into the valve housing 14 designed as one piece, so that the valve housing 14 forms the essential constituent of the valve subassembly 4 and merely yet needs to be connected to the drive 36. The drive 36, as described, is connected to the shaft 62. Preferably, the internal control device 38 is integrated into the drive 36 or its motor housing 16. The internal sensors 48 and 50 which are inserted directly into the valve housing 14, as shown in FIG. 1, are connected via cables 78 to the internal control device 38 in the motor housing. 16. Thus all electrical connections are arranged outside the valve housing 14, so that these are protected from moisture or humidity.

While specific embodiments of the invention have been shown and described in detail to illustrate the application of the principles of the invention, it will be understood that the invention may be embodied otherwise without departing from such principles.

APPENDIX:

List of Reference Numbers

| | |
|---|---|
| 2 | circulation pump assembly |
| 4 | valve subassembly |
| 6 | pump housing |
| 8 | entry |
| 10 | motor housing or stator housing |
| 12 | electronics housing |
| 14 | valve housing |
| 16 | motor housing |
| 18 | feed or feed conduit |
| 20 | return or return conduit |
| 22 | receiving space |
| 24 | valve element |
| 26 | recess |
| 28, 30 | valve seats |
| 32 | closed part |
| 34 | valve |
| 36 | drive |
| 38 | internal control device |
| 40 | external control device |
| 42 | drive motor |
| 44 | first communication interface |
| 46 | second communication interface |
| 48, 50, 52 | sensors |
| 54 | node point |
| 56 | temperature sensor |
| 58, 58' | check valves |
| 60 | opening |
| 62 | shaft |
| 64 | assembly opening |
| 65 | sieve insert |

APPENDIX:-continued

List of Reference Numbers

| | |
|---|---|
| 66, 68 | sensor receivers with sensor spaces |
| 70 | first connection channel |
| 72 | second connection channel |
| 74 | first connection channel |
| 76 | second connection channel |
| 78 | cable |
| A, B, A-B | connections |
| S | flow direction |

What is claimed is:

1. A heating installation or cooling installation mixing device comprising:
   a valve housing comprising a first connection, a second connection and a third connection and defining a first flow path from the first connection to the second connection and defining a second flow path from the first connection to the third connection;
   a movable valve element arranged in an inside of the valve housing in communication with the two flow paths, said valve element being configured and arranged such that a ratio of cross sections of the two flow paths to one another can be varied by way of displacing the valve element;
   a drive for moving the valve element, the drive being arranged on the valve housing, the drive comprising an internal control device for movement control of the drive, the internal control device comprises a first communication interface for communication with an external control device comprising a corresponding second communication interface;
   at least one internal sensor arranged in or on the valve housing, the at least one sensor being connected to the first communication interface for transmitting a sensor signal to the external control device;
   a motor housing, the drive being arranged in the motor housing and the motor housing being connected to the valve housing or the motor housing being formed as one piece with the valve housing, the internal control device being arranged in the motor housing or the internal control device being arranged in an electronics housing connected to the motor housing;
   wherein at least one external sensor is arranged outside the valve housing and is connected to the external control device in a manner separate from at least the first communication interface.

2. A heating installation or cooling installation mixing device according to claim 1, wherein the internal control device is configured to set and closed-loop control a position of the valve element which is specified by the external control device, via the drive.

3. A heating installation or cooling installation mixing device according to claim 1, wherein the at least one sensor is arranged in the valve housing on or in one of the flow paths so as to detect at least one state variable of the medium located in the one of the flow paths.

4. A heating installation or cooling installation mixing device according to claim 1, wherein at least one of the at least one internal sensor and at least one external sensor is at least one of a pressure sensor, a temperature sensor and a flow sensor.

5. A heating installation or cooling installation mixing device according to claim 1, further comprising a cable running outside the valve housing wherein the at least one internal sensor is connected to the first communication interface via the cable.

6. A heating installation or cooling installation mixing device according to claim 1, wherein the first communication interface and the second communication interface are configured as wireless communication interfaces.

7. A heating installation or cooling installation mixing device according to claim 1, further comprising at least one circulation pump assembly connected or connectable to one of the connections of the valve housing.

8. A heating installation or cooling installation mixing device according to claim 7, wherein the external control device is part of the circulation pump assembly and simultaneously serves for controlling the circulation pump assembly.

9. A heating installation or cooling installation mixing device according to claim 7, wherein the external control device is configured for at least one of a control and a regulation of a position of the valve element and of a control and a regulation of a speed of the at least one circulation pump assembly, on the basis of at least one output signal of the at least one sensor and is configured to generate an output of a setpoint for the position of the valve element, to the internal control device.

10. A heating installation or cooling installation mixing device according to claim 1, wherein the at least one sensor detects a pressure difference between at least one of the connections and a receiving space, in which the valve element is arranged and pressure difference between two of the connections.

11. A heating installation or cooling installation mixing device according to claim 10, wherein the external control device is configured to compute a flow through the mixing device on a basis of at least one pressure difference detected by the at least one sensor.

12. A heating installation or cooling installation mixing device according to claim 1, wherein the valve housing comprises an outwardly opened sensor receiver, into which the at least one sensor is removably inserted from the outside.

13. A heating installation or cooling installation mixing device according to claim 1, wherein:
   the at last one sensor is an internal sensor with at least a detection section arranged in a sensor space of the sensor receiver in the inside of the valve housing; and
   the sensor space is connected via at least one connection channel to at least one of the flow paths, and the sensor space is situated outside the flow paths.

14. A heating installation or cooling installation mixing device according to claim 13, wherein the sensor space is connected with a first connection channel to one of the flow paths, upstream of the valve element, and with a second connection channel to a receiving space, in which the valve element is arranged.

15. A heating installation or cooling installation mixing device according to claim 1, wherein the first connection, the second connection and the third connection, a receiving space, in which the valve element is arranged, as well as at least one sensor receiver for the at least one internal sensor are arranged in a common, single-piece section of the valve housing.

16. A heating installation or cooling installation mixing device according to claim 1, wherein the flow direction through the flow paths either runs from the second connection and the third connection to the first connection or vice versa from the first connection to the second connection and to the third connection.

17. A heating installation or cooling installation mixing device comprising:
- a valve housing comprising a valve housing interior, a first connection, a second connection and a third connection and defining a first flow path from the first connection to the second connection and defining a second flow path from the first connection to the third connection;
- a movable valve element arranged in the valve housing interior in communication with the two flow paths, the valve element being configured and arranged such that a ratio of cross sections of the two flow paths to one another can be varied by way of displacing the valve element;
- a pump assembly housing comprising a pump assembly housing interior;
- an external control device arranged in the pump assembly housing interior, the external control device comprising a second communication interface;
- a drive for moving the valve element, the drive comprising an internal control device for movement control of the drive, the internal control device comprising a first communication interface for communication with the second communication interface;
- an internal sensor arranged in or on the valve housing, the at least one internal sensor being connected to the first communication interface for transmitting a sensor signal to the external control device;
- a motor housing connected to the valve housing, the motor housing being arranged adjacent to the valve housing, the drive and the internal control device being arranged in the motor housing;
- wherein at least one external sensor is arranged outside the valve housing and is connected to the external control device in a manner separate from at least the first communication interface.

18. A heating installation or cooling installation mixing device according to claim 17, wherein the pump assembly housing comprises a pump housing, a motor pump housing and an electronics pump housing, the external control device being arranged in the electronics pump housing, the motor pump housing being arranged adjacent to the pump housing and the electronics pump housing, the motor pump housing being located between the pump housing and the electronics pump housing.

19. A heating installation or cooling installation mixing device comprising:
- a valve assembly comprising a valve assembly motor housing and a valve housing, the valve assembly motor housing being connected to the valve housing, wherein the valve assembly motor housing is arranged adjacent to the valve housing, the valve housing comprising a valve housing interior, a first connection, a second connection and a third connection and defining a first flow path from the first connection to the second connection and defining a second flow path from the first connection to the third connection, the valve assembly motor housing comprising a valve assembly motor housing interior;
- a movable valve element arranged in the valve housing interior in communication with the two flow paths, the valve element being configured and arranged such that a ratio of cross sections of the two flow paths to one another can be varied by way of displacing the valve element;
- a pump assembly comprising a pump assembly electronics housing, the pump assembly electronics housing being located at a spaced location from the valve assembly motor housing and the valve housing, the pump assembly electronics housing having a pump assembly electronics housing interior;
- an external control device arranged in the pump assembly electronics housing interior, the external control device comprising a second communication interface;
- a drive for moving the valve element, at least a portion of the drive being arranged in the valve assembly motor housing, the drive comprising an internal control device for movement control of the drive, the internal control device comprising a first communication interface for communication with the second communication interface of the external control device, the internal control device being arranged in the valve assembly motor housing interior;
- an internal sensor arranged in or on the valve housing, the at least one sensor being connected to the first communication interface for transmitting a sensor signal to the external control device;
- wherein at least one external sensor is arranged outside the valve housing and is connected to the external control device in a manner separate from at least the first communication interface.

* * * * *